US012180874B2

(12) United States Patent
Weinmann et al.

(10) Patent No.: US 12,180,874 B2
(45) Date of Patent: Dec. 31, 2024

(54) MIXER

(71) Applicant: Purem GmbH, Neunkirchen (DE)

(72) Inventors: Philipp Weinmann, Esslingen (DE); Heike Többen, Uhingen (DE); Oleksandr Velyaev, Stuttgart (DE); Alex Paule, Plochingen (DE)

(73) Assignee: Purem GmbH, Neunkirchen (DE)

( * ) Notice: Subject to any disclaimer, the term of this patent is extended or adjusted under 35 U.S.C. 154(b) by 85 days.

(21) Appl. No.: 18/046,004

(22) Filed: Oct. 12, 2022

(65) Prior Publication Data

US 2023/0113789 A1    Apr. 13, 2023

(30) Foreign Application Priority Data

Oct. 12, 2021 (DE) .................. 10 2021 126 364.6

(51) Int. Cl.
*F01N 3/28* (2006.01)

(52) U.S. Cl.
CPC ........ *F01N 3/2892* (2013.01); *F01N 2470/20* (2013.01); *F01N 2490/16* (2013.01); *F01N 2610/1453* (2013.01)

(58) Field of Classification Search
CPC .... F01N 3/2066; F01N 3/2892; F01N 3/0293; F01N 3/2821; F01N 2610/02; F01N 2610/1453; F01N 2240/20; F01N 2470/20; F01N 2490/16; B01D 53/9418; B01D 53/9431; B01F 25/3131; B01F 25/431; B01F 25/3141; B01F 25/4231
USPC .......................................... 60/317, 282, 299
See application file for complete search history.

(56) References Cited

U.S. PATENT DOCUMENTS

| 10,024,217 | B1* | 7/2018 | Johnson | B01D 53/9431 |
| 10,287,948 | B1* | 5/2019 | Moulieres | B01F 25/4521 |
| 11,585,256 | B2* | 2/2023 | Kast | B01F 25/3131 |
| 11,702,974 | B2* | 7/2023 | Kast | B01F 25/31422 |
| | | | | 60/715 |
| 2020/0032692 | A1* | 1/2020 | Wang | F01N 3/0293 |
| 2020/0408131 | A1 | 12/2020 | Kurpejovic et al. | |

FOREIGN PATENT DOCUMENTS

| CN | 208040490 U | 11/2018 | |
| DE | 10 2016 108 113 A1 | 11/2017 | |
| DE | 10 2019 210 877 A1 | 1/2020 | |
| EP | 3757364 A1 * | 12/2020 | .......... B01F 3/04049 |

* cited by examiner

*Primary Examiner* — Kenneth J Hansen
*Assistant Examiner* — Kelsey L Stanek
(74) *Attorney, Agent, or Firm* — Walter Ottesen, P.A.

(57) ABSTRACT

A mixer for an exhaust system of an internal combustion engine for mixing exhaust gas and reactant includes a mixing chamber, a reactant dispensing arrangement for dispensing reactant into the mixing chamber axially between an upstream mixer wall and a downstream mixer wall, an inlet opening arrangement in the upstream mixer wall, an outlet opening arrangement in the downstream mixer wall, a flow guiding arrangement arranged between the upstream mixer wall and the downstream mixer wall, wherein the flow guiding arrangement provides a first flow path leading from the inlet opening arrangement to the outlet opening arrangement and a second flow path leading from the inlet opening arrangement to the outlet opening arrangement, wherein each flow path has at least two flow channels leading from the inlet opening arrangement to the outlet opening arrangement.

26 Claims, 6 Drawing Sheets

MIXER

CROSS REFERENCE TO RELATED APPLICATION

This application claims priority of German patent application no. 10 2021 126 364.6, filed Oct. 12, 2021, the entire content of which is incorporated herein by reference.

TECHNICAL FIELD

The present disclosure relates to a mixer which is used in an exhaust system of an internal combustion engine to mix exhaust gas emitted by an internal combustion engine and reactant injected into the exhaust gas.

BACKGROUND

In order to reduce pollutant emissions, particularly from diesel internal combustion engines, there is a known practice of injecting a reactant, for example, a urea/water solution, into the exhaust gas emitted by the internal combustion engine upstream of an SCR catalytic converter arrangement in an exhaust system. This reactant promotes or enables the selective catalytic reduction to be carried out in the SCR catalytic converter arrangement in order to reduce the nitrogen oxide content in the exhaust gas.

SUMMARY

It is an object of the present disclosure to provide a mixer for an exhaust system of an internal combustion engine for mixing the exhaust gas and the reactant, via which mixer efficient, uniform mixing of the exhaust gas and the reactant injected into the latter is achieved.

According to the disclosure, this object is, for example, achieved by a mixer for an exhaust system of an internal combustion engine for mixing exhaust gas and reactant including:
  a mixing chamber, wherein the mixing chamber is delimited by an upstream mixer wall, a downstream mixer wall following the upstream mixer wall in the direction of a mixer longitudinal axis and arranged at an axial distance therefrom, and a circumferential wall extending between the upstream mixer wall and the downstream mixer wall,
  a reactant dispensing arrangement for dispensing reactant into the mixing chamber axially between the upstream mixer wall and the downstream mixer wall, preferably in a main reactant dispensing direction oriented substantially radially in relation to the mixer longitudinal axis,
  an inlet opening arrangement in the upstream mixer wall,
  an outlet opening arrangement in the downstream mixer wall or the circumferential wall,
  a flow guiding arrangement, arranged between the upstream mixer wall and the downstream mixer wall, for guiding exhaust gas or/and reactant from the inlet opening arrangement to the outlet opening arrangement, wherein the flow guiding arrangement provides a first flow path leading from the inlet opening arrangement to the outlet opening arrangement and a second flow path leading from the inlet opening arrangement to the outlet opening arrangement, wherein each flow path has at least two flow channels leading from the inlet opening arrangement to the outlet opening arrangement.

Dividing the exhaust gas flow in the mixing chamber between a plurality of flow paths, each of which guides part of the overall exhaust gas flow, and passing each part of the exhaust gas flow which is guided in a flow path through a plurality of flow channels ensures, on the one hand, by virtue of the turbulence which inevitably arises during this flow guidance or flow division, that the exhaust gas and the reactant are well mixed as they flow in the direction of the outlet opening arrangement. On the other hand, passing the exhaust gas and the reactant through a multiplicity of flow channels, each bounded by surfaces of components of the mixer, ensures that there is a large total surface area with which, in particular, the reactant can come into contact. During the operation of an internal combustion engine, these surfaces are raised to a comparatively high temperature by the exhaust gas flow guided along them, thereby promoting the evaporation of the reactant, which is generally introduced in the form of a spray mist.

In a mixer according to the disclosure, the portions of the overall exhaust gas flow which are guided in the two flow paths are guided between the inlet opening arrangement and the outlet opening arrangement in a manner parallel to one another in terms of flow but fundamentally separated from one another spatially. Likewise, in each of the flow paths, in the flow channels thereof, the portions of the overall exhaust gas flow which flow therein are guided between the inlet opening arrangement and the outlet opening arrangement in a manner parallel to one another in terms of flow but fundamentally separated from one another spatially. This does not exclude openings being provided in one or more walls that separate such flow channels, for example, in order to be able to achieve pressure compensation between the individual flow channels. With such a configuration too, the portions of the overall exhaust gas flow which are guided in the individual flow channels flow in volume regions which are separated spatially from one another, and they do not form parts of an overall flow guided in a single volume.

In order to avoid non-uniformity in the intermixing of the exhaust gas and the reactant in the two flow paths, it is proposed that the first flow path with its flow channels and the second flow path with its flow channels be of substantially mirror-symmetrical configuration with respect to one another in relation to a mixer center plane preferably containing the mixer longitudinal axis. In this case, for example, the reactant dispensed into the mixing chamber by the reactant dispensing arrangement can be introduced into the mixing chamber with a main reactant dispensing direction that is substantially in the mixer center plane.

Uniform flow through the mixing chamber can furthermore be promoted if the inlet opening arrangement includes in each case at least one inlet opening on both sides of a mixer center plane preferably containing the mixer longitudinal axis, or/and if the inlet opening arrangement is of substantially mirror-symmetrical configuration in relation to the mixer center plane.

For this purpose, provision can be made for the outlet opening arrangement to include at least one outlet opening arranged in a centered manner in relation to a mixer center plane preferably containing the mixer longitudinal axis, or/and for the outlet opening arrangement to be of substantially mirror-symmetrical configuration in relation to the mixer center plane, or/and for the outlet opening arrangement to include at least two outlet openings in the downstream mixer wall which are radially staggered in relation to the mixer longitudinal axis.

To make available the flow channels provided in association with the two flow paths, the flow guiding arrangement can include, in association with at least one, preferably each, flow path, at least two flow guiding walls extending between the upstream mixer wall and the downstream mixer wall, wherein at least one flow guiding wall, together with the circumferential wall, delimits a flow channel or/and at least one flow guiding wall, together with a further flow guiding wall, delimits a flow channel.

For a structure which is simple to implement but is nevertheless stable, it is proposed that the flow guiding walls extend between the upstream mixer wall and the downstream mixer wall in a manner substantially parallel to the mixer longitudinal axis, or/and that the flow guiding walls are connected to the upstream mixer wall and the downstream mixer wall by material joining, preferably welding or brazing, or/and positive engagement.

A simple structure which promotes defined flow guidance can furthermore be achieved in that the flow guiding arrangement includes at least one flow guiding element providing a flow guiding wall for each of the flow paths. Such a flow guiding element can, for example, be of one-piece configuration, that is, can be formed from a single part or monolithically.

The flow guiding arrangement can include an outer flow guiding element, wherein the outer flow guiding element, together with the circumferential wall for example, delimits an outer flow channel of the first flow path and delimits an outer flow channel of the second flow path, wherein the outer flow guiding element provides an outer transitional region, wherein, in the outer transitional region, an outer flow guiding wall, provided by the outer flow guiding element, of the first flow path merges into an outer flow guiding wall, provided by the outer flow guiding element, of the second flow path, or/and wherein the outer flow guiding element provides an outer opening region for the entry of exhaust gas or/and reactant into a region of the mixing chamber which is surrounded by the outer flow guiding element.

In order in this case to be able to produce the largest possible flow path along the outer flow guiding element, the outer opening region provided by the outer flow guiding element can be positioned substantially opposite the outer transitional region provided by the outer flow guiding element in relation to the mixer longitudinal axis.

The flow guiding arrangement can include an inner flow guiding element, wherein the inner flow guiding element, together with a further flow guiding element for example, delimits an inner flow channel of the first flow path and delimits an inner flow channel of the second flow path, wherein the inner flow guiding element provides an inner transitional region, wherein, in the inner transitional region, an inner flow guiding wall, provided by the inner flow guiding element, of the first flow path merges into an inner flow guiding wall, provided by the inner flow guiding element, of the second flow path, or/and wherein the inner flow guiding element provides an inner opening region for the entry of exhaust gas or/and reactant into a region of the mixing chamber which is surrounded by the inner flow guiding element.

In order also to be able to produce a flow path which is as long as possible and substantially of the same length in both flow paths along the inner flow guiding element, it is proposed that the inner opening region provided by the inner flow guiding element is positioned substantially opposite the inner transitional region provided by the inner flow guiding element in relation to the mixer longitudinal axis.

The inner transitional region can in this case be arranged in the region of the outer opening region in the circumferential direction around the mixer longitudinal axis, or/and the inner flow guiding element can cover the outer opening region in the circumferential direction. The outer transitional region can furthermore be arranged in the region of the inner opening region in the circumferential direction around the mixer longitudinal axis, or/and the outer flow guiding element can cover the inner opening region in the circumferential direction.

In order to promote uniform flow through the mixing chamber and thus uniform mixing of the exhaust gas and the reactant via the shaping of the flow guiding elements, it is proposed that the outer flow guiding element is of substantially mirror-symmetrical configuration in relation to a mixer center plane preferably containing the mixer longitudinal axis, or/and that the inner flow guiding element is of substantially mirror-symmetrical configuration in relation to a mixer center plane preferably containing the mixer longitudinal axis or is of substantially point-symmetrical configuration in relation to an axis of symmetry preferably orthogonal to the central longitudinal axis.

In order to provide a large number of flow channels, the flow guiding arrangement can include, in association with the first flow path, at least one central flow guiding wall of the first flow path, which central flow guiding wall is arranged between the outer flow guiding wall of the first flow path and the inner flow guiding wall of the first flow path, wherein the at least one central flow guiding wall of the first flow path, with the outer flow guiding wall of the first flow path, delimits a central flow channel of the first flow path and, with the inner flow guiding wall of the first flow path, delimits the inner flow channel of the first flow path, or/and the flow guiding arrangement can include, in association with the second flow path, at least one central flow guiding wall of the second flow path, which central flow guiding wall is arranged between the outer flow guiding wall of the second flow path and the inner flow guiding wall of the second flow path, wherein the at least one central flow guiding wall of the second flow path, with the outer flow guiding wall of the second flow path, delimits a central flow channel of the second flow path and, with the inner flow guiding wall of the second flow path, delimits the inner flow channel of the second flow path.

For the entry of exhaust gas into the different flow channels of the two flow paths, the at least one central flow guiding wall of the first flow path and the at least one central flow guiding wall of the second flow path can provide a first central opening region. In this case, the first central opening region can be arranged in the region of the outer opening region in the circumferential direction in relation to the mixer longitudinal axis, or/and can have a shorter circumferential length of extent than the outer opening region, or/and the at least one central flow guiding wall of the first flow path and the at least one central flow guiding wall of the second flow path can provide a second central opening region, wherein the second central opening region is arranged in the region of the inner opening region in the circumferential direction in relation to the mixer longitudinal axis, or/and has a shorter circumferential length of extent than the inner opening region.

For a symmetrical configuration of the mixer, the at least one central flow guiding wall of the first flow path and the at least one central flow guiding wall of the second flow path can be arranged in a substantially mirror-symmetrical manner in relation to a mixer center plane preferably containing the mixer longitudinal axis.

In an alternative embodiment, in which an inner flow guiding element is provided only for the purpose of joint provision of the inner flow guiding walls, for example, the flow guiding arrangement can include, in association with the first flow path, at least one further flow guiding wall of the first flow path, which further flow guiding wall is arranged between the circumferential wall and the inner flow guiding wall of the first flow path, wherein the at least one further flow guiding wall of the first flow path delimits, with the circumferential wall for example, an outer flow channel of the first flow path, and, with the inner flow guiding wall of the first flow path, delimits the inner flow channel of the first flow path, or/and the flow guiding arrangement can include, in association with the second flow path, at least one further flow guiding wall of the second flow path, which further flow guiding wall is arranged between the circumferential wall and the inner flow guiding wall of the second flow path, wherein the at least one further flow guiding wall of the second flow path delimits, with the circumferential wall for example, an outer flow channel of the second flow path, and, with the inner flow guiding wall of the second flow path, delimits the inner flow channel of the second flow path.

In order to provide as large a number of flow channels as possible even with such a structure, the flow guiding arrangement can include, in association with the first flow path, two further flow guiding walls, wherein the further flow guiding walls of the first flow path delimit an outer flow channel of the first flow path, or/and the flow guiding arrangement can include, in association with the second flow path, two further flow guiding walls, wherein the further flow guiding walls of the second flow path delimit an outer flow channel of the second flow path.

Here, uniform mixing can be promoted if the at least one further flow guiding wall of the first flow path and the at least one further flow guiding wall of the second flow path are arranged in a substantially mirror-symmetrical manner in relation to a mixer center plane preferably containing the mixer longitudinal axis.

To further promote the mixing of the exhaust gas and the reactant downstream of the mixing chamber as well, a mixing element having a plurality of exhaust gas passage openings can be provided downstream of the outlet opening arrangement.

To construct an elongate exhaust system, the circumferential wall can be provided by a tubular mixer housing which is elongate in the direction of the mixer longitudinal axis, wherein, in a region upstream of the upstream mixer wall and downstream of the downstream mixer wall, the mixer housing in each case provides an exhaust gas flow channel which adjoins the mixing chamber in the direction of the mixer longitudinal axis, wherein the exhaust gas flow channel arranged upstream of the upstream mixer wall is open to the mixing chamber via the inlet opening arrangement formed in the upstream mixer wall, and the mixing chamber is open to the exhaust gas flow channel arranged downstream of the downstream mixer wall via the outlet opening arrangement formed in the downstream mixer wall, and wherein a main exhaust gas flow direction in the exhaust gas flow channel arranged upstream of the upstream mixer wall corresponds substantially to a main exhaust gas flow direction in the exhaust gas flow channel arranged downstream of the downstream mixer wall.

In an exhaust system with a spiral exhaust gas flow path, the upstream mixer wall and the downstream mixer wall can be provided by a box-like mixer housing, wherein the box-like mixer housing has an inflow opening region leading to the upstream mixer wall and an outflow opening region, wherein a main exhaust gas flow direction in the outflow opening region is substantially opposite to a main exhaust gas flow direction in the inflow opening region.

The disclosure furthermore relates to an exhaust system for an internal combustion engine, including a mixer according to the disclosure.

BRIEF DESCRIPTION OF THE DRAWINGS

The invention will now be described with reference to the drawings wherein.

DESCRIPTION OF THE PREFERRED EMBODIMENTS

Figure 1:
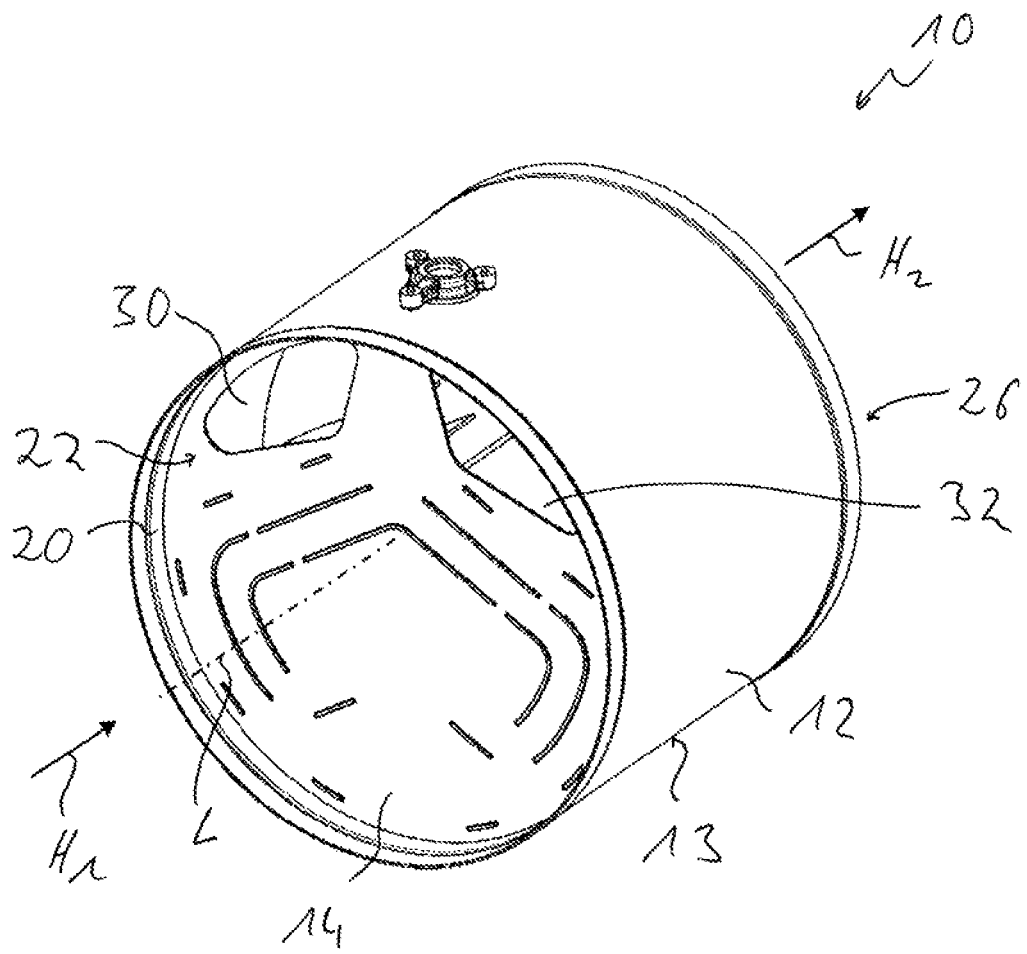
FIG. 1 shows a perspective view of a first embodiment of a mixer for an exhaust system.
Figure 2:
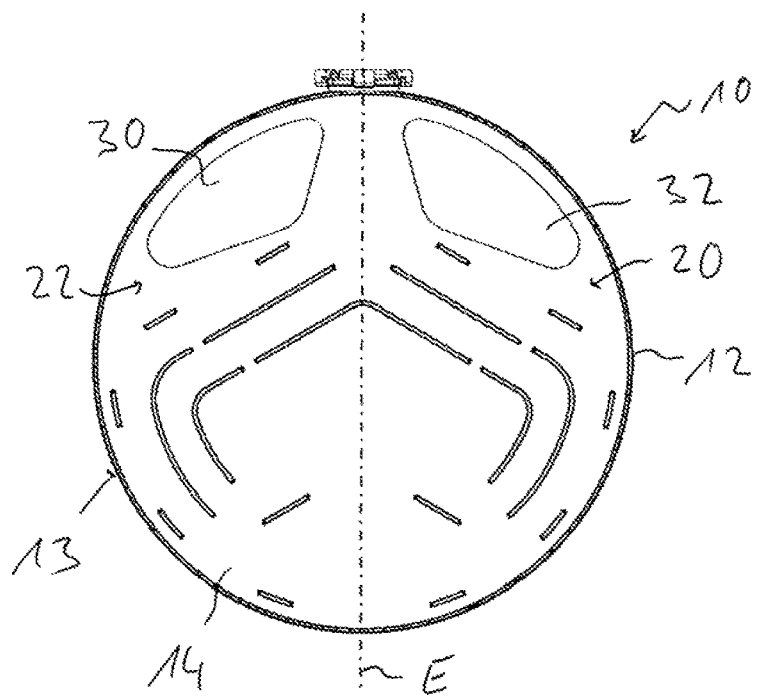
FIG. 2 shows a view of the mixer of FIG. 1 looking downstream.

A first embodiment of a mixer 10 for an exhaust system of an internal combustion engine is illustrated in FIGS. 1 to 5.

The mixer 10, which is elongate substantially in the direction of a mixer longitudinal axis L, includes a circumferential wall 12 which is elongate in the direction of the mixer longitudinal axis L or surrounds the latter, an upstream mixer wall 14, and a downstream mixer wall 16, which is arranged at an axial distance from the upstream mixer wall 14 in the direction of the mixer longitudinal axis. The mixer walls 14, 16, which are preferably constructed from sheet metal material, can be firmly connected, for example, by welding, brazing or the like, to the circumferential wall 12, which is preferably likewise constructed from sheet metal material and essentially provides a tubular mixer housing 13.

A mixing chamber 18 is formed axially between the upstream mixer wall 14 and the downstream mixer wall 16. Exhaust gas which flows toward the upstream mixer wall 14 through an exhaust gas flow channel 20 extending upstream of the upstream mixer wall 14 in the direction of a main exhaust gas flow direction $H_1$ upstream of the upstream mixer wall 14 can enter the mixing chamber 18 through an inlet opening arrangement 22 formed in the upstream mixer wall 14. In the downstream mixer wall 16, an outlet opening arrangement 34 is formed, through which exhaust gas or a mixture of exhaust gas and reactant emerges from the mixing chamber 18 and enters an exhaust gas channel 26 which runs downstream of the downstream mixer wall 16 and in which the exhaust gas or the mixture of exhaust gas and reactant flows in an exhaust gas flow direction $H_2$ which corresponds substantially to the main exhaust gas flow direction $H_1$ in the region of the exhaust gas flow channel 20.

A reactant, in the form of a spray cone for example, is injected substantially perpendicularly to the mixer longitudinal axis via a reactant dispensing arrangement 28, which is referred to in general as an injector and is supported on the circumferential wall 12. The reactant dispensing arrangement can be arranged in such a way that the reactant is injected with a main reactant dispensing direction R, which corresponds, for example, to a center axis of the spray cone, into the mixing chamber 18, which is located in a mixer center plane E that also contains the mixer longitudinal axis L.

In the embodiment illustrated, the inlet opening arrangement 22 includes two inlet openings 30, 32, which are arranged on both sides of the mixer center plane E and are of substantially mirror-symmetrical configuration in relation to the latter. These are offset radially outward in relation to the mixer longitudinal axis L and, in particular, are located closer to the circumferential wall 12 than to the mixer longitudinal axis L. The mixer longitudinal axis L can be, for example, a longitudinal center axis of the mixer housing 13.

An outlet opening arrangement 34 is provided in the downstream mixer wall 16. In the embodiment illustrated, this includes two radially staggered outlet openings 36, 38, which are of substantially mirror-symmetrical configuration in relation to the mixer center plane E. The two radially staggered outlet openings 36, 38 are located radially between the mixer longitudinal axis L, that is, the radial center of the mixer 10, and the circumferential wall 12, and, in particular, are arranged in such a way that, when viewed in the direction of the mixer longitudinal axis L, there is no overlap between the inlet opening arrangement 22 and the outlet opening arrangement 34. Exhaust gas which enters the mixing chamber 18 through the inlet opening arrangement 22 can therefore not flow axially through the mixing chamber 18 and out of the latter via the outlet opening arrangement 34 without being deflected in the mixing chamber 18.

A flow guiding arrangement designated in general by 40 is provided between the upstream mixer wall 14 and the downstream mixer wall 16. The flow guiding arrangement 40 includes a plurality of flow guiding walls explained in more detail below or flow guiding elements providing them and provides two flow paths 42, 42'. The flow paths 42, 42' guide the exhaust gas entering the mixing chamber 18 via the inlet opening arrangement 22 through the mixing chamber 18 to the outlet opening arrangement 34. The flow paths 42, 42', which in terms of flow lead parallel to the outlet opening arrangement 34, are of substantially mirror-symmetrical configuration in relation to the mixer center plane E.

In the embodiment illustrated, each of the two flow paths 42, 42' has three flow channels. A respective outer flow channel 44, 44' is formed between the circumferential wall 12 and a respective outer flow guiding wall 46, 46'. A respective central flow channel 48, 48' is formed between the respective outer flow guiding wall 46, 46' and a respective central flow guiding wall 50, 50'. Finally, in each of the flow paths 42, 42', a respective inner flow channel 52, 52' is formed or delimited between the respective central flow guiding wall 50, 50' and a respective inner flow guiding wall 54, 54'.

Figure 3:
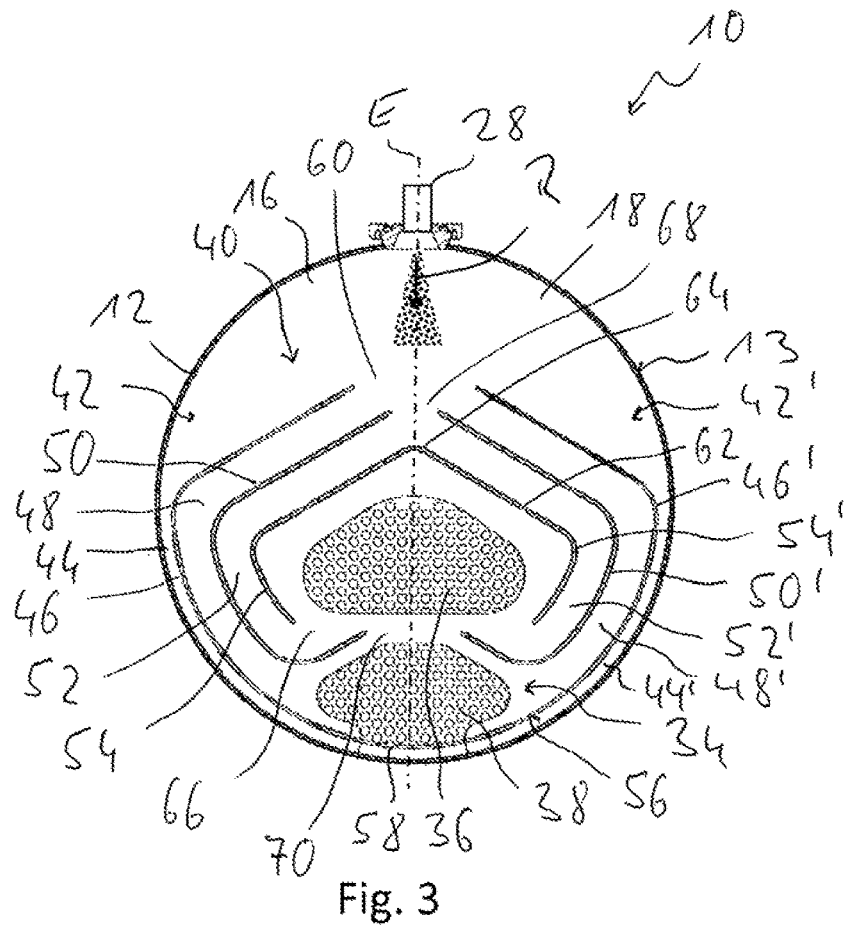
FIG. 3 shows a cross-sectional view of the mixer of FIG. 1, sectioned between an upstream mixer wall and a downstream mixer wall, looking downstream.
Figure 4:
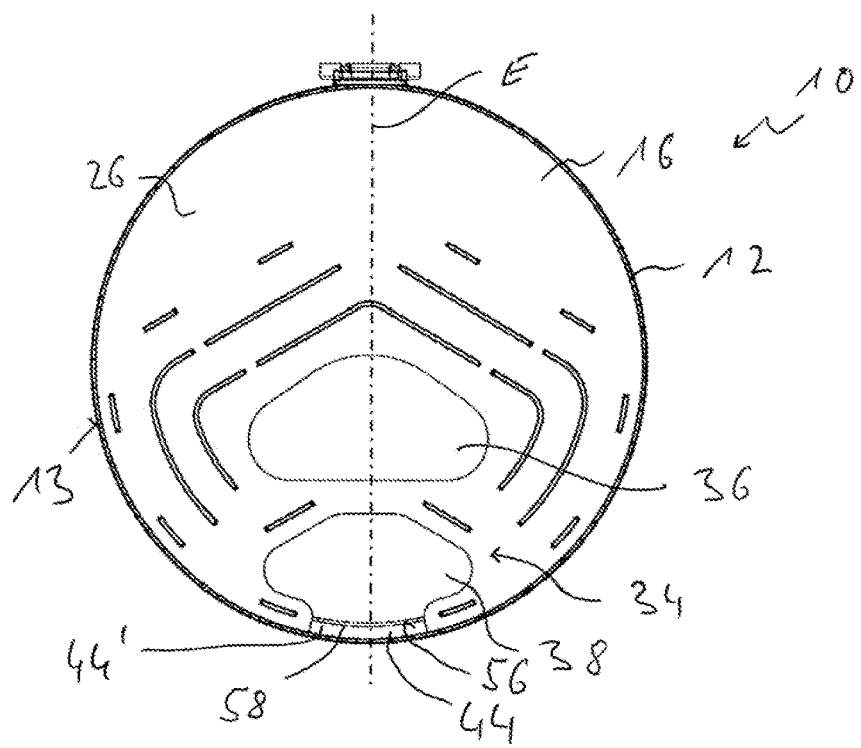
FIG. 4 shows a view of the mixer of FIG. 1 looking upstream.

It can be seen from the illustration of FIG. 3 that the two outer flow guiding walls 46, 46' are provided by a common outer flow guiding element 56. In a circumferential region which corresponds substantially to the positioning of the outlet opening arrangement 34, the outer flow guiding element 56, which is provided, for example, as a sheet metal formed part, provides an outer transitional region 58, in which the two outer flow guiding walls 46, 46' adjoin or merge with one another. In a circumferential region lying opposite the outer transitional region 58 in relation to the mixer longitudinal axis L, the outer flow guiding element 56 forms an outer opening region 60, via which exhaust gas or reactant can enter the region of the mixing chamber 18 surrounded by the outer flow guiding element 56.

The two inner flow guiding walls 54, 54' are provided jointly by an inner flow guiding element 62. This too can be configured as a sheet metal formed part and, approximately in the region of the mixer longitudinal axis L, provides an inner transitional region 64, in which the inner flow guiding walls 54, 54' adjoin one another or merge into one another. The inner transitional region 64 of the inner flow guiding element 62 is positioned in such a way that it lies in the region of the outer opening region 60 of the outer flow guiding element 56 or covers it. In the circumferential region lying opposite the outer transitional region 58 of the outer flow guiding element 56, the inner flow guiding element 62 has an inner opening region 66, via which exhaust gas or reactant can enter the region of the mixing chamber 18 which is surrounded by the inner flow guiding element 62.

The two central flow guiding walls 50, 50', which are provided as separate components, provide a first central opening region 68 in the circumferential region in which the outer opening region 60 of the outer flow guiding element 56 and the inner transitional region 64 of the inner flow guiding element 62 are positioned, and provide a second central opening region 70 in the circumferential region in which the outer transitional region 58 of the outer flow guiding element 56 and the inner opening region 66 of the inner flow guiding element 62 are positioned. The first central opening region 68 has a smaller circumferential extent than the outer opening region 60, and the second central opening region 70 has a smaller circumferential extent than the inner opening region 66. The end regions of the central flow guiding walls 50, 50', the ends forming the second central opening region 70 between them, can be shaped in such a way that they reach between the two outlet openings 36, 38 and guide exhaust gas or reactant flowing through the respective inner flow channel 52, 52' in the direction of the outlet opening 36, which is located radially further in and has a larger opening cross section.

It can clearly be seen in FIG. 3 that, particularly also to obtain the mirror-symmetrical configuration of the flow paths 42, 42', the respective flow guiding walls 46, 50, 54, on the one hand, and 46', 50', 54', on the other hand, associated therewith are arranged in a substantially mirror-symmetrical manner in relation to the mixer center plane E, with the result that in particular the opening regions 60, 66, 68, 70 are also arranged in a substantially mirror-symmetrical or centered manner in relation to the mixer center plane E.

The flow guiding walls 46, 46', 50, 50', 54, 54', which are arranged between the upstream mixer wall 14 and the downstream mixer wall 16, or the flow guiding elements 56, 62 which provide the walls extend substantially in the direction of the mixer longitudinal axis L between the mixer walls 14, 16. For firm attachment to the upstream mixer wall 14 and the downstream mixer wall 16, slot-like openings can be provided in the walls, into which engagement projections on the axial end regions of the flow guiding walls or flow guiding elements can be positioned so as to engage. These projections can be seen in the axial views of FIGS. 2 and 4. In these regions, the flow guiding walls or flow guiding elements can be firmly connected to the mixer walls 14, 16, for example by material joining, for example welding or brazing. As an alternative or in addition, the flow guiding walls or flow guiding elements can be firmly connected to the mixer walls 14, 16 in these regions by positive engagement. Complete gas-tight connection of the flow guiding walls or flow guiding elements to the mixer walls 14, 16 is advantageous, but not absolutely necessary, since, owing to the dimensioning of the inlet openings 30, 32 or of the outlet openings 36, 38, substantially the entire exhaust gas flow will pass through them.

Figure 5:
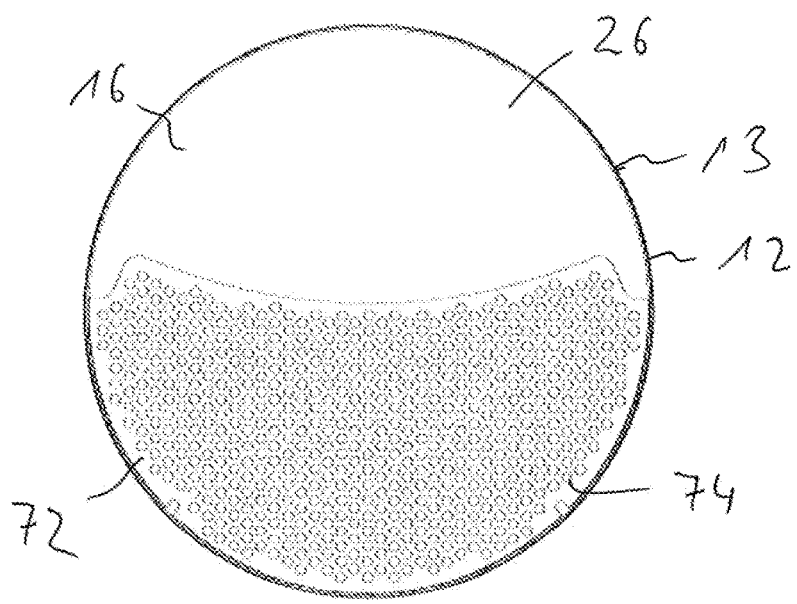
FIG. 5 shows another view of the mixer of FIG. 1 looking upstream.

Arranged in the exhaust gas channel 26 running downstream of the downstream mixer wall 16 is a mixing element 72, shaped like a semicircular disk or moon for example, which can be seen in FIG. 5. This is at an axial distance from the downstream mixer wall 16 and is arranged or dimensioned in such a way that, when viewed in the axial direction, it completely covers the outlet opening arrangement 34. Provided in the mixing element 72, which, like the upstream mixer wall 14 and the downstream mixer wall 16, is of substantially plate-like configuration and is arranged substantially orthogonally to the mixer longitudinal axis L, is a multiplicity of exhaust gas passage openings 74. The first thing that the mixture of exhaust gas and reactant emerging from the mixing chamber 18 via the outlet opening arrangement 34 strikes in the exhaust gas channel 26 is the mixing element 72. Part of the flow of exhaust gas and reactant is deflected sideways by the mixing element 72 and passes into the cross-sectional region of the exhaust gas channel 26 which is not covered by the mixing element 72. The remaining part of the mixture of exhaust gas and reactant leaving the mixing chamber 18 flows through the exhaust gas passage openings 74 of the mixing element 72. This promotes the mixing of the exhaust gas and the reactant, so that, after the mixing element 72 in the exhaust gas channel 26, an exhaust gas flow which is mixed substantially homogeneously with reactant flows onward substantially in the direction of the mixer longitudinal axis L in the main exhaust gas flow direction $H_1$.

Figure 6:
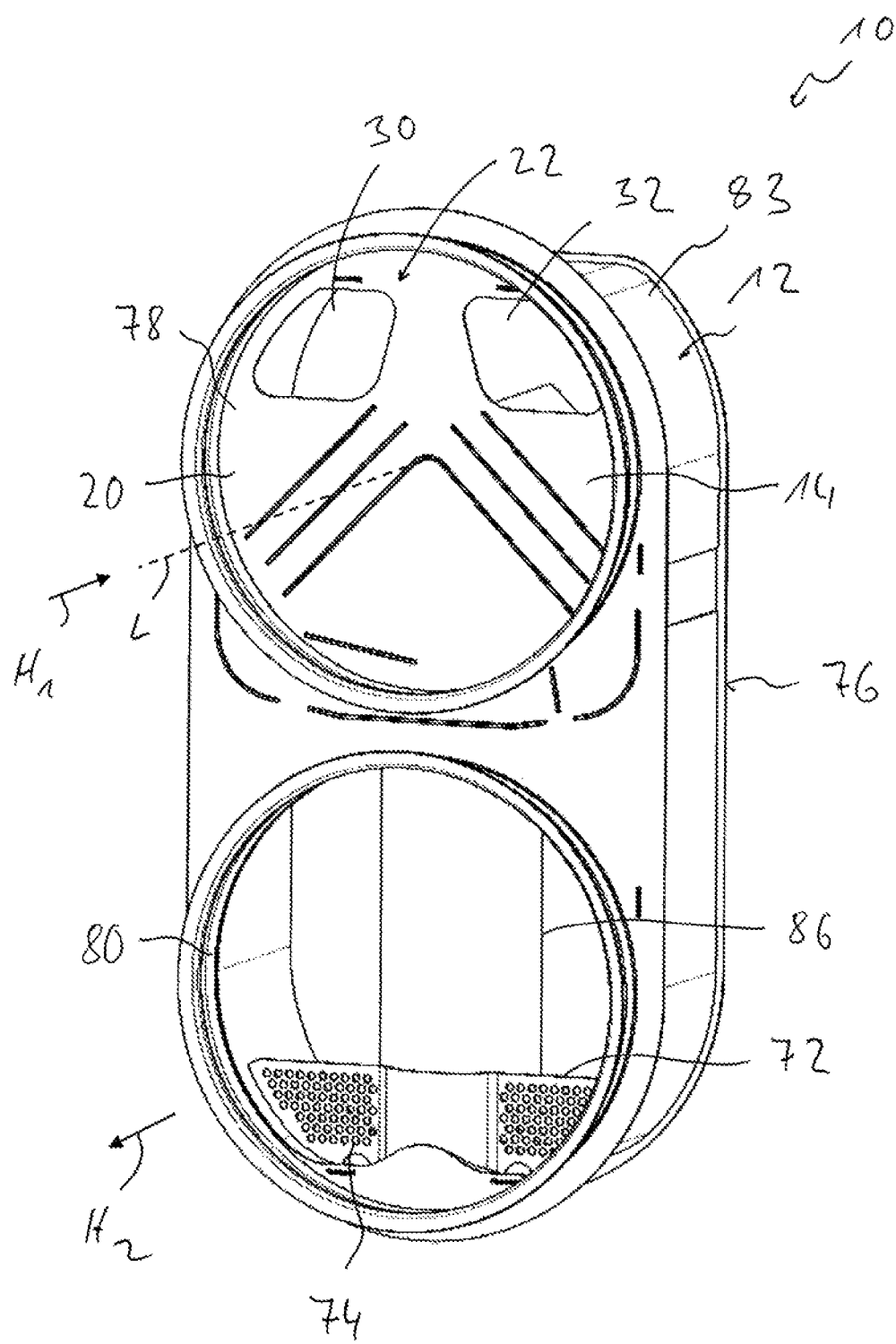
FIG. 6 shows a perspective view of an alternative embodiment of a mixer for an exhaust system.
Figure 7:
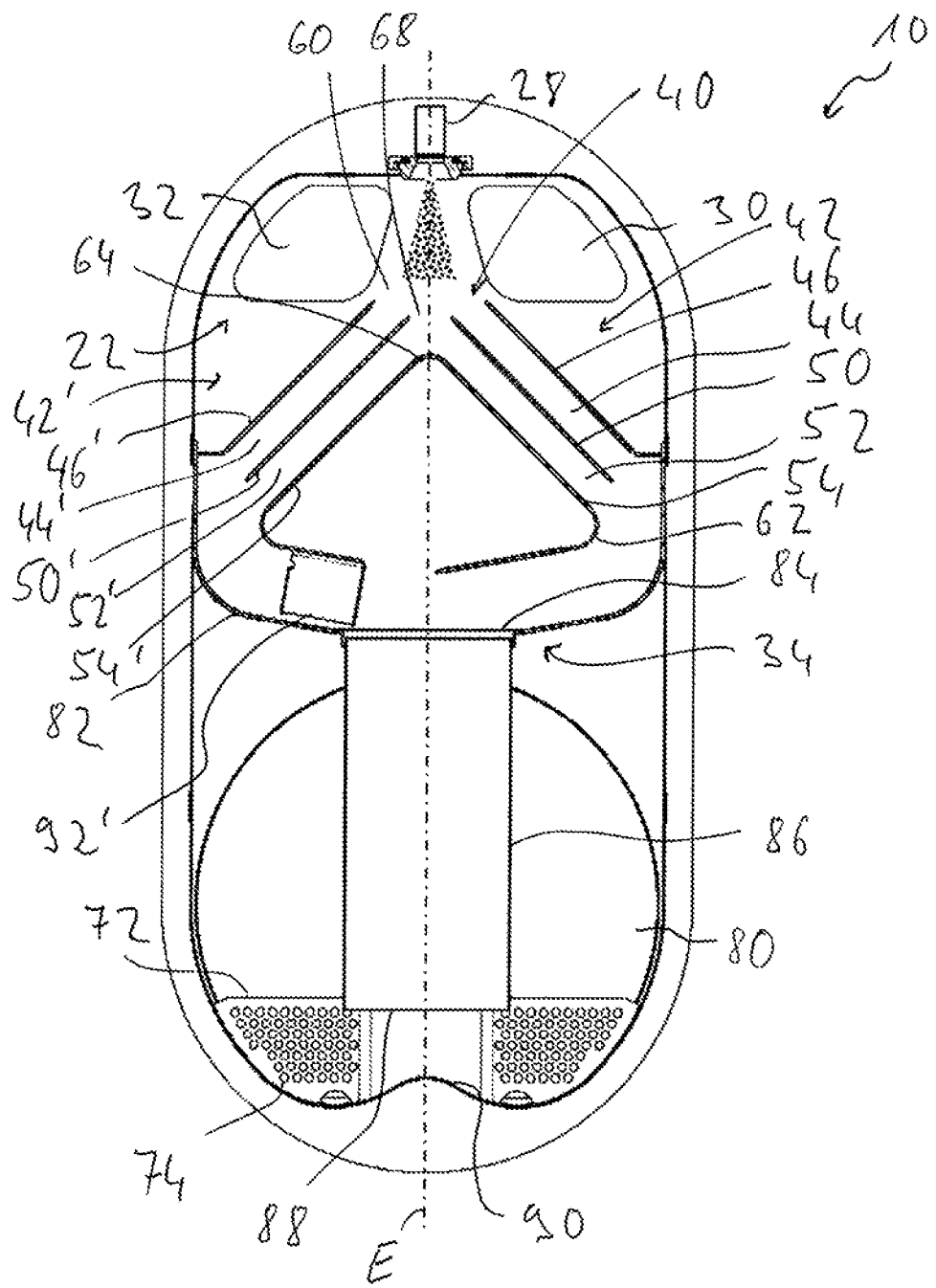
FIG. 7 shows a cross-sectional view of the mixer of FIG. 6 looking upstream; and, FIG. 8 shows a cross-sectional view of the mixer of FIG. 6 looking downstream.
Figure 8:
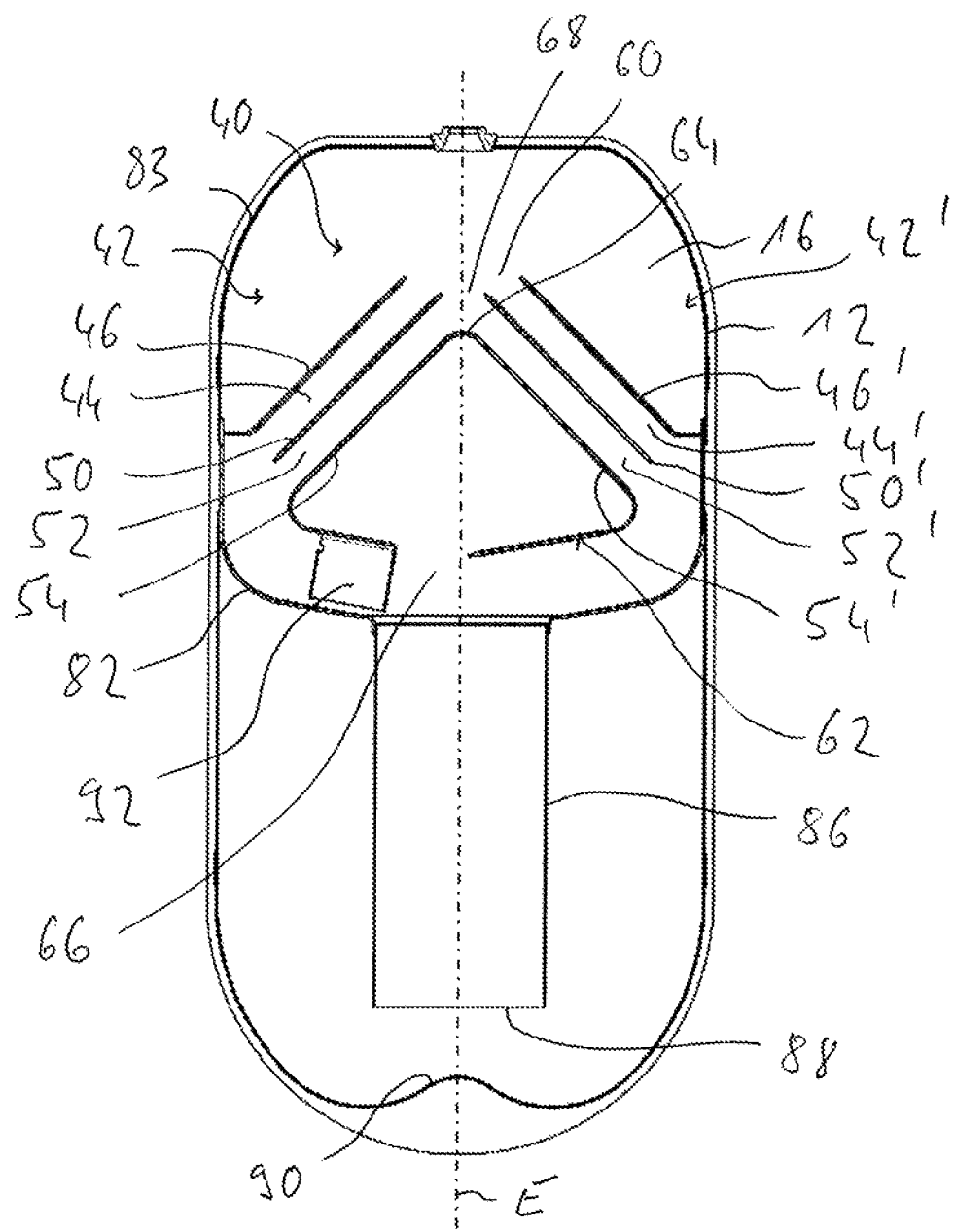

An alternative embodiment of a mixer 10 for an exhaust system of an internal combustion engine is illustrated in FIGS. 6 to 8. Components which correspond to above-described components in terms of structure or function are denoted by the same reference signs.

In the embodiment illustrated in FIGS. 6 to 8, the upstream mixer wall 14 and the downstream mixer wall 16 as well as a part of the circumferential wall 12 are provided by a box-like mixer housing 76. In association with the upstream mixer wall 14, an inflow opening region 78, which is provided, for example, by a cylindrical projection, is provided on the box-like mixer housing 76. Through this or an adjoining tubular exhaust gas guiding element, exhaust gas can flow in the main exhaust gas flow direction $H_1$ in the direction of the mixer longitudinal axis L toward the upstream mixer wall 14 or the inlet opening arrangement 22 formed therein. Offset transversely to the longitudinal axis L of the mixer, an outflow opening region 80, which is likewise provided, for example, by a substantially cylindrical projection, is formed in the box-like mixer housing 76, from which region the exhaust gas or the mixture of exhaust gas and reactant, after flowing through the mixer 10, flows, for example, into a substantially tubular exhaust gas guiding component in the direction of the exhaust gas flow direction $H_2$, which is thus oriented substantially opposite to the main exhaust gas flow direction $H_1$ upstream of the upstream mixer wall 14.

Arranged in the interior of the box-like mixer housing 76 is a circumferential wall element 82 which, together with a circumferential wall section 83 of the box-like mixer housing 76, provides the circumferential wall 12 which radially outwardly surrounds the mixing chamber 18. An outlet opening 84 of the outlet opening arrangement 34 is provided in a section of the circumferential wall element 82 which is central with respect to the mixer center plane E of the mixer 10. In the region of this outlet opening 84, a tubular exhaust gas guiding element 86 adjoins the circumferential wall element 82. Exhaust gas or a mixture of exhaust gas and reactant emerging from the mixing chamber 18 in the region of the outlet opening 84 passes into the exhaust gas guiding element 86 and emerges from the latter in the region of an outlet opening 88 in an exhaust gas flow direction which is substantially orthogonal to the main exhaust gas flow directions $H_1$, $H_2$. Opposite the outlet opening 88 is a deflection region 90 of the mixer housing 76, which deflection region is curved toward this outlet opening and via which the flow of exhaust gas and reactant emerging from the outlet opening 88 is deflected sideways. The region of the outflow opening region 80 in which the outlet opening 88 of the exhaust gas guiding element 86 is also positioned is covered by the mixing element 72. After deflection at the deflection region 90, the exhaust gas emerging from the outlet opening 88 thus flows either through the exhaust gas passage openings 74 of the mixing element 72 or past the mixing element 72 into the outflow opening region 80 and then further into the then following exhaust gas guiding component.

In the mixer illustrated in FIGS. 6 to 8 too, a flow guiding arrangement 40 is provided which has two flow paths 42, 42' which, in terms of flow, lead substantially parallel to the outlet opening arrangement 34. These flow paths 42, 42' too are of substantially mirror-symmetrical configuration in relation to the mixer center plane E. In this embodiment too, the flow guiding arrangement 40 includes the inner flow guiding element 62 with its inner transitional region 64 oriented in the upstream direction.

The flow guiding arrangement 40 further includes the two central flow guiding walls 50, 50', which, together with the inner flow guiding element 62 or the inner flow guiding walls 54, 54' provided by the element delimit the inner flow channels 52, 52'.

The flow guiding arrangement 40 further includes the outer flow guiding walls 46, 46', which, together with the central flow guiding walls 50, 50', define outer flow channels 44, 44'. In this embodiment, the two outer flow guiding walls 46, 46' are not provided by a common flow guiding element but are configured as separate components and, in their downstream end regions, adjoin the circumferential wall 12 or the circumferential wall element 82. In an alternative embodiment, the two outer flow guiding walls 46, 46' could be formed integrally with the circumferential wall element 82, and, in this embodiment, the circumferential wall element 82 would therefore form a flow guiding element that provided two flow guiding walls.

Given the construction of the mixer 10 illustrated in FIGS. 6 to 8, the exhaust gas passing into the mixing chamber 18 through the inlet opening arrangement 22, as well as the reactant dispensed by the reactant dispensing arrangement 28, flows in the direction of the outer opening region 60, formed between the upstream ends of the outer flow guiding walls 46, 46', and the first central opening region 68, formed between the upstream ends of the central flow guiding walls 50, 50'. The exhaust gas or reactant is divided between the two flow paths 42, 42' or the two flow channels 44, 52 and 44', 52' present in each of the two flow paths 42, 42' and flows along these flow channels 44, 52 and 44', 52' in the direction of the outlet opening 84 formed in the circumferential wall element 82. At the downstream ends of the respective inner and outer flow channels 44, 52 and 44', 52' in each flow path 42, 42', the flow of exhaust gas and reactant is reunited and guided to the outlet opening 84 by the circumferential wall element 82, on the one hand, and the downstream end regions of the inner flow guiding walls 54, 54'.

In order to further promote the mixing of exhaust gas and reactant when or before the mixture of exhaust gas and reactant enters the outlet opening 84, flow deflection elements 92, 92' prepared by bending are provided at the ends of the inner flow guiding walls 54, 54' which between them form the inner opening region 66. These deflect the part of the flow of exhaust gas and reactant guided in the respective flow path 42, 42' in the direction of the mixer longitudinal axis L in mutually opposite directions, with the result that a swirling flow is generated as it flows into the outlet opening 84.

In this embodiment, the flow guiding element 62 which provides the inner flow guiding walls 54, 54' is not configured to be exactly mirror-symmetrical with respect to the mixer center plane E since, particularly in the end regions, which provide the flow deflecting elements 92, 92', the flow guiding walls 54, 54' do not have a mirror-symmetrical configuration but a configuration which is point-symmetrical in relation to an axis of symmetry which is substantially orthogonal to the mixer longitudinal axis L. In the illustrations in FIGS. 7 and 8, this axis of symmetry is represented, for example, by the line E designating the mixer center plane, which is orthogonal to the plane of the drawing.

The embodiment of a mixer according to the disclosure in such a way that the exhaust gas flow is divided between two flow paths in the region of the mixing chamber and flows through at least two flow channels in each flow path ensures that the exhaust gas and also the reactant injected into it can come into contact with the mixer or components thereof over comparatively large surface areas. On the one hand, this promotes turbulence and, on the other hand, the heating of the reactant, thus efficiently promoting its evaporation and thus also mixing with the exhaust gas.

It is understood that the foregoing description is that of the preferred embodiments of the invention and that various changes and modifications may be made thereto without departing from the spirit and scope of the invention as defined in the appended claims.

What is claimed is:

1. A mixer for an exhaust system of an internal combustion engine for mixing exhaust gas and reactant, the mixer comprising:
   a mixing chamber delimited by an upstream mixer wall, a downstream mixer wall following the upstream mixer wall in a direction of a mixer longitudinal axis (L) and arranged at an axial distance from said upstream mixer wall, and a circumferential wall extending between said upstream mixer wall and said downstream mixer wall;
   a reactant dispenser for dispensing reactant into said mixing chamber axially between said upstream mixer wall and said downstream mixer wall;
   an inlet opening arrangement in said upstream mixer wall;
   an outlet opening arrangement in said downstream mixer wall or said circumferential wall;
   a flow guide, arranged between said upstream mixer wall and said downstream mixer wall, said flow guide being configured to guide a mixture of the exhaust gas and the reactant from said inlet opening arrangement to said outlet opening arrangement, wherein said flow guide provides a first flow path leading from said inlet opening arrangement to said outlet opening arrangement and a second flow path leading from said inlet opening arrangement to said outlet opening arrangement; and, wherein said first flow path and said second flow path each have at least two flow channels leading from said inlet opening arrangement to said outlet opening arrangement,
   wherein said flow guide includes, in association with at least one of said first flow path and said second flow path, at least two flow guiding walls extending between said upstream mixer wall and said downstream mixer wall and connected to said upstream mixer wall and said downstream mixer wall by at least one of material joining and positive engagement; and, wherein at least one of:
   at least one of said at least two flow guiding walls, together with said circumferential wall, delimits a corresponding one of said at least two flow channels; and,
   at least one of said at least two flow guiding walls, together with a further flow guiding wall, delimits a corresponding one of said at least two flow channels.

2. The mixer of claim 1, wherein said first flow path with said at least two flow channels and the second flow path with said at least two flow channels are of mirror-symmetrical configuration with respect to one another in relation to a mixer center plane (E) containing the mixer longitudinal axis (L).

3. The mixer of claim 1, wherein at least one of: said inlet opening arrangement includes at least one inlet opening on each side of a mixer center plane (E); and, wherein said inlet opening arrangement is of mirror-symmetrical configuration in relation to the mixer center plane (E).

4. The mixer of claim 1, wherein at least one of: said outlet opening arrangement includes at least one outlet opening arranged in a centered manner in relation to a mixer center plane (E); said outlet opening arrangement has a mirror-symmetrical design in relation to the mixer center plane (E); and, said outlet opening arrangement includes at least two outlet openings in said downstream mixer wall, wherein said at least two outlet openings are radially staggered in relation to the mixer longitudinal axis (L).

5. The mixer of claim 1, wherein said flow guide includes, in association with each one of said first flow path and said second flow path, said at least two flow guiding walls extending between said upstream mixer wall and said downstream mixer wall.

6. The mixer of claim 1, wherein at least one of:
   said at least two flow guiding walls extend between said upstream mixer wall and said downstream mixer wall in a manner parallel to the mixer longitudinal axis (L).

7. The mixer of claim 1, wherein said flow guide includes at least one flow guiding element; and, said at least one flow guiding element provides a corresponding one of said at least two guide walls for each of said first flow path and said second flow path.

8. The mixer of claim 7, wherein said at least two flow channels of said second flow path include a second outer flow channel and said at least at least two flow channels of said first flow path include a first outer flow channel; wherein said flow guide includes an outer flow guiding element delimiting said first outer flow channel and said second outer flow channel; said outer flow guiding element provides an outer transitional region; said outer flow guiding element, in said outer transitional region, provides one of said at least two guiding walls of said first flow path configured as an outer flow guiding wall which merges into a corresponding one of said at least two guiding walls of said second flow path configured as an outer flow guiding wall of said second flow path; or/and, said outer flow guiding element provides an outer opening region for at least one of entry of the exhaust gas and the reactant in a region of the mixing chamber surrounded by said outer flow guiding element.

9. The mixer of claim 8, wherein said outer opening region is positioned opposite said outer transitional region in relation to the mixer longitudinal axis (L).

10. The mixer of claim 8, wherein said at least two flow channels of said second flow path include a second inner flow channel and said at least two flow channels of said first flow path include a first inner flow channel; said flow guide includes an inner flow guiding element; said inner flow guiding element delimits said first inner flow channel and delimits said second inner flow channel; said inner flow guiding element provides an inner transitional region; wherein said inner flow guiding element provides one of said at least two guiding walls of said first flow path configured as an inner flow guiding wall in said transitional region and said inner flow guiding wall merges into a corresponding one of said at least two guiding walls of said second flow path configured as an inner flow guiding wall; or/and, wherein said inner flow guiding element provides an inner opening region for entry of at least one of the exhaust gas and the reactant into a region of said mixing chamber which is surrounded by said inner flow guiding element; wherein at least one of:
said inner transitional region is arranged in a region of said outer opening region in a circumferential direction around the mixer longitudinal axis (L);
said inner flow guiding element covers said outer opening region in the circumferential direction;
said outer transitional region is arranged in a region of the inner opening region in the circumferential direction around the mixer longitudinal axis (L);
said outer flow guiding element covers said inner opening region in the circumferential direction.

11. The mixer of claim 8, wherein said at least two flow channels of said second flow path include a second inner flow channel and said at least two flow channels of said first flow path include a first inner flow channel; said flow guide includes an inner flow guiding element; said inner flow guiding element delimits said first inner flow channel and delimits said second inner flow channel; said inner flow guiding element provides an inner transitional region; wherein said inner flow guiding element provides one of said at least two guiding walls of said first flow path configured as an inner flow guiding wall in said transitional region and said inner flow guiding wall merges into a corresponding one of said at least two guiding walls of said second flow path configured as an inner flow guiding wall; or/and, wherein said inner flow guiding element provides an inner opening region for entry of at least one of the exhaust gas and the reactant into a region of said mixing chamber which is surrounded by said inner flow guiding element; wherein at least one of:
said outer flow guiding element is of mirror-symmetrical configuration in relation to a mixer center plane (E);
said inner flow guiding element is of mirror-symmetrical configuration in relation to a mixer center plane (E) or is of substantially point-symmetrical configuration in relation to an axis of symmetry preferably orthogonal to the central longitudinal axis (L).

12. The mixer of claim 8, wherein said at least two flow channels of said second flow path include a second inner flow channel and said at least two flow channels of said first flow path include a first inner flow channel; said flow guide includes an inner flow guiding element; said inner flow guiding element delimits said first inner flow channel and delimits said second inner flow channel; said inner flow guiding element provides an inner transitional region; wherein said inner flow guiding element provides one of said at least two guiding walls of said first flow path configured as an inner flow guiding wall in said transitional region and said inner flow guiding wall merges into a corresponding one of said at least two guiding walls of said second flow path configured as an inner flow guiding wall; or/and, wherein said inner flow guiding element provides an inner opening region for entry of at least one of the exhaust gas and the reactant into a region of said mixing chamber which is surrounded by said inner flow guiding element; wherein at least one of:
said flow guide includes, in association with said first flow path, at least one first central flow guiding wall of said first flow path, wherein said first central flow guiding wall is arranged between said outer flow guiding wall of said first flow path and said inner flow guiding wall of said first flow path, wherein said at least one first central flow guiding wall of said first flow path, with said outer flow guiding wall of said first flow path, delimits a corresponding one of said at least two channels of said first flow path configured as a first central flow channel and with said inner flow guiding wall of said first flow path delimits a corresponding one of said at least two channels of said first flow path configured as an inner flow channel; and,
said flow guide includes, in association with said second flow path, at least one second central flow guiding wall of said second flow path, wherein said second central flow guiding wall is arranged between said outer flow guiding wall of said second flow path and said inner flow guiding wall of said second flow path, wherein said at least one central flow guiding wall of said second flow path, with said second outer flow guiding wall, delimits a corresponding one of said at least two channels of said second flow path configured as a second central flow channel and, with said inner flow guiding wall of said second flow path delimits a corresponding one of said at least two channels of said second flow path configured as an inner flow channel.

13. The mixer of claim 12, wherein said at least one central flow guiding wall of said first flow path and said at least one central flow guiding wall of said second flow path provide a first central opening region; wherein said first central opening region is arranged in a region of said outer opening region in a circumferential direction in relation to the mixer longitudinal axis (L) or/and has a shorter circumferential length of extent than said outer opening region; or/and wherein said at least one central flow guiding wall of said first flow path and said at least one central flow guiding wall of said second flow path provide a second central opening region; wherein said second central opening region is arranged in the region of said inner opening region in the circumferential direction in relation to the mixer longitudinal axis (L) or/and has a shorter circumferential length of extent than said inner opening region.

14. The mixer of claim 12, wherein said at least one central flow guiding wall of said first flow path and said at least one central flow guiding wall of said second flow path are arranged in a mirror-symmetrical manner in relation to a mixer center plane (E) containing the mixer longitudinal axis (L).

15. The mixer of claim 7, wherein said at least two flow channels of said second flow path include a second inner flow channel and said at least two flow channels of said first flow path include a first inner flow channel; said flow guide includes an inner flow guiding element; said inner flow guiding element delimits said first inner flow channel and delimits said second inner flow channel; said inner flow guiding element provides an inner transitional region; wherein said inner flow guiding element provides one of said at least two guiding walls of said first flow path configured as an inner flow guiding wall in said transitional region and said inner flow guiding wall merges into a corresponding one of said at least two guiding walls of said second flow path configured as an inner flow guiding wall; or/and, wherein said inner flow guiding element provides an inner opening region for entry of at least one of the exhaust gas and the reactant into a region of said mixing chamber which is surrounded by said inner flow guiding element.

16. The mixer of claim 15, wherein said inner opening region provided by said inner flow guiding element is positioned opposite said inner transitional region provided by said inner flow guiding element in relation to the mixer longitudinal axis (L).

17. The mixer of claim 15, wherein said flow guide includes, in association with said first flow path, at least one further flow guiding wall of said first flow path; said further flow guiding wall is arranged between said circumferential wall and said inner flow guiding wall of said first flow path; wherein said at least one further flow guiding wall of said first flow path delimits an outer flow channel of said first flow path, and, with said inner flow guiding wall of said first flow path, delimits said inner flow channel of said first flow path; or/and wherein said flow guiding arrangement includes, in association with a second flow path, at least one further flow guiding wall of said second flow path, which further flow guiding wall is arranged between said circumferential wall and said inner flow guiding wall of said second flow path, wherein said at least one further flow guiding wall of said second flow path delimits an outer flow channel of said second flow path, and, with said inner flow guiding wall of said second flow path, delimits said inner flow channel of said second flow path.

18. The mixer of claim 17, wherein said flow guiding arrangement includes, in association with said first flow path, two further flow guiding walls, wherein said further flow guiding walls of said first flow path delimit an outer flow channel of said first flow path; or/and wherein the flow guiding arrangement includes, in association with said second flow path, two further flow guiding walls, wherein the further flow guiding walls of the second flow path delimit an outer flow channel of said second flow path.

19. The mixer of claim 17, wherein said at least one further flow guiding wall of said first flow path and said at least one further flow guiding wall of said second flow path are arranged in a mirror-symmetrical manner in relation to a mixer center plane (E).

20. The mixer of claim 1 further comprising a mixing element having a plurality of exhaust gas passage openings, wherein said mixing element is disposed downstream of said outlet opening arrangement.

21. The mixer of claim 1, wherein said circumferential wall is provided by a tubular mixer housing; said tubular mixer housing being elongate in a direction of the mixer longitudinal axis (L); wherein, in a region upstream of said upstream mixer wall and downstream of said downstream mixer wall, said tubular mixer housing in each case provides an exhaust gas flow channel which adjoins said mixing chamber in the direction of the mixer longitudinal axis (L); wherein said exhaust gas flow channel arranged upstream of the upstream mixer wall is open to the mixing chamber via the inlet opening arrangement formed in the upstream mixer wall, and the mixing chamber is open to the exhaust gas flow channel arranged downstream of the downstream mixer wall via the outlet opening arrangement formed in the downstream mixer wall, and wherein a main exhaust gas flow direction in the exhaust gas flow channel arranged upstream of said upstream mixer wall corresponds substantially to a main exhaust gas flow direction in said exhaust gas flow channel arranged downstream of said downstream mixer wall.

22. The mixer of claim 1, wherein said upstream mixer wall and said downstream mixer wall are provided by a box-like mixer housing; said box-like mixer housing has an inflow opening region leading to said upstream mixer wall and an outflow opening region; and, a main exhaust gas flow direction in said outflow opening region is opposite to a main exhaust gas flow direction in said inflow opening region.

23. The mixer of claim 1, wherein said reactant dispenser is configured to dispense reactant in a main reactant dispensing direction (R) oriented radially in relation to the mixer longitudinal axis (L).

24. An exhaust system for an internal combustion engine, comprising a mixer for mixing exhaust gas and reactant, the mixer comprising:
a mixing chamber delimited by an upstream mixer wall, a downstream mixer wall following the upstream mixer wall in a direction of a mixer longitudinal axis (L) and arranged at an axial distance from said upstream mixer wall, and a circumferential wall extending between said upstream mixer wall and said downstream mixer wall;
a reactant dispenser for dispensing reactant into said mixing chamber axially between said upstream mixer wall and said downstream mixer wall;
an inlet opening arrangement in said upstream mixer wall;
an outlet opening arrangement in said downstream mixer wall or said circumferential wall;
a flow guide, arranged between said upstream mixer wall and said downstream mixer wall, said flow guide being configured to guide a mixture of the exhaust gas and the reactant from said inlet opening arrangement to said outlet opening arrangement, wherein said flow guide provides a first flow path leading from said inlet opening arrangement to said outlet opening arrangement and a second flow path leading from said inlet opening arrangement to said outlet opening arrangement; and, wherein said first flow path and said second flow path each have at least two flow channels leading from said inlet opening arrangement to said outlet opening arrangement,
wherein said flow guide includes, in association with at least one of said first flow path and said second flow path, at least two flow guiding walls extending between said upstream mixer wall and said downstream mixer wall and connected to said upstream mixer wall and said downstream mixer wall by at least one of material joining and positive engagement; and, wherein at least one of:
at least one of said at least two flow guiding walls, together with said circumferential wall, delimits a corresponding one of said at least two flow channels; and,
at least one of said at least two flow guiding walls, together with a further flow guiding wall, delimits a corresponding one of said at least two flow channels.

25. A mixer for an exhaust system of an internal combustion engine for mixing exhaust gas and reactant, the mixer comprising:

a mixing chamber delimited by an upstream mixer wall, a downstream mixer wall following the upstream mixer wall in a direction of a mixer longitudinal axis (L) and arranged at an axial distance from said upstream mixer wall, and a circumferential wall extending between said upstream mixer wall and said downstream mixer wall;

a reactant dispenser for dispensing reactant into said mixing chamber axially between said upstream mixer wall and said downstream mixer wall;

an inlet opening arrangement in said upstream mixer wall;

an outlet opening arrangement in said downstream mixer wall or said circumferential wall;

a flow guide, arranged between said upstream mixer wall and said downstream mixer wall, said flow guide being configured to guide at least one of the exhaust gas and the reactant from said inlet opening arrangement to said outlet opening arrangement, wherein said flow guide provides a first flow path leading from said inlet opening arrangement to said outlet opening arrangement and a second flow path leading from said inlet opening arrangement to said outlet opening arrangement; and, wherein said first flow path and said second flow path each have at least two flow channels leading from said inlet opening arrangement to said outlet opening arrangement, wherein said flow guide includes, in association with at least one of said first flow path and said second flow path, at least two flow guiding walls extending between said upstream mixer wall and said downstream mixer wall; and, wherein at least one of:

at least one of said at least two flow guiding walls, together with said circumferential wall, delimits a corresponding one of said at least two flow channels;

at least one of said at least two flow guiding walls, together with a further flow guiding wall, delimits a corresponding one of said at least two flow channels;

wherein said flow guide includes at least one flow guiding element, said at least one flow guiding element providing a corresponding one of said at least two guide walls for each of said first flow path and said second flow path;

wherein said at least two flow channels of said second flow path include a second outer flow channel and said at least at least two flow channels of said first flow path include a first outer flow channel; wherein said flow guide includes an outer flow guiding element delimiting said first outer flow channel and said second outer flow channel; said outer flow guiding element provides an outer transitional region;

wherein at least one of:

said outer flow guiding element, in said outer transitional region, provides one of said at least two guiding walls of said first flow path configured as an outer flow guiding wall which merges into a corresponding one of said at least two guiding walls of said second flow path configured as an outer flow guiding wall of said second flow path; and said outer flow guiding element provides an outer opening region for at least one of entry of the exhaust gas and the reactant in a region of the mixing chamber surrounded by said outer flow guiding element.

26. An exhaust system for an internal combustion engine, comprising a mixer for mixing exhaust gas and reactant, the mixer comprising:

a mixing chamber delimited by an upstream mixer wall, a downstream mixer wall following the upstream mixer wall in a direction of a mixer longitudinal axis (L) and arranged at an axial distance from said upstream mixer wall, and a circumferential wall extending between said upstream mixer wall and said downstream mixer wall;

a reactant dispenser for dispensing reactant into said mixing chamber axially between said upstream mixer wall and said downstream mixer wall;

an inlet opening arrangement in said upstream mixer wall;

an outlet opening arrangement in said downstream mixer wall or said circumferential wall;

a flow guide, arranged between said upstream mixer wall and said downstream mixer wall, said flow guide being configured to guide at least one of the exhaust gas and the reactant from said inlet opening arrangement to said outlet opening arrangement, wherein said flow guide provides a first flow path leading from said inlet opening arrangement to said outlet opening arrangement and a second flow path leading from said inlet opening arrangement to said outlet opening arrangement; and, wherein said first flow path and said second flow path each have at least two flow channels leading from said inlet opening arrangement to said outlet opening arrangement, wherein said flow guide includes, in association with at least one of said first flow path and said second flow path, at least two flow guiding walls extending between said upstream mixer wall and said downstream mixer wall; and, wherein at least one of:

at least one of said at least two flow guiding walls, together with said circumferential wall, delimits a corresponding one of said at least two flow channels;

at least one of said at least two flow guiding walls, together with a further flow guiding wall, delimits a corresponding one of said at least two flow channels;

wherein said flow guide includes at least one flow guiding element, said at least one flow guiding element providing a corresponding one of said at least two guide walls for each of said first flow path and said second flow path;

wherein said at least two flow channels of said second flow path include a second outer flow channel and said at least at least two flow channels of said first flow path include a first outer flow channel; wherein said flow guide includes an outer flow guiding element delimiting said first outer flow channel and said second outer flow channel; said outer flow guiding element provides an outer transitional region;

wherein at least one of:

said outer flow guiding element, in said outer transitional region, provides one of said at least two guiding walls of said first flow path configured as an outer flow guiding wall which merges into a corresponding one of said at least two guiding walls of said second flow path configured as an outer flow guiding wall of said second flow path; and said outer flow guiding element provides an outer opening region for at least one of entry of the exhaust gas and the reactant in a region of the mixing chamber surrounded by said outer flow guiding element.

\* \* \* \* \*